United States Patent
Magd et al.

(10) Patent No.: US 11,898,013 B2
(45) Date of Patent: Feb. 13, 2024

(54) PROCESS FOR PRODUCING A WATER-REPELLENT AND RELEASE COATING ON A SUPPORT

(71) Applicant: Elkem Silicones France SAS, Lyons (FR)

(72) Inventors: Frederic Magd, Tassin la Demi Lune (FR); Frederic Marchal, Lyons (FR); Yassine Maadadi, Meyzieu (FR); Thierry Walter, Fontaines sur Saone (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 1171 days.

(21) Appl. No.: 16/499,171

(22) PCT Filed: Mar. 29, 2018

(86) PCT No.: PCT/EP2018/058261
§ 371 (c)(1),
(2) Date: Sep. 27, 2019

(87) PCT Pub. No.: WO2018/178321
PCT Pub. Date: Oct. 4, 2018

(65) Prior Publication Data
US 2021/0108105 A1    Apr. 15, 2021

(30) Foreign Application Priority Data
Mar. 30, 2017    (FR) ....................... 1700348

(51) Int. Cl.
| | | |
|---|---|---|
| *C09D 5/22* | (2006.01) | |
| *C08G 77/12* | (2006.01) | |
| *C08F 2/24* | (2006.01) | |
| *C09D 5/02* | (2006.01) | |
| *C08G 77/20* | (2006.01) | |
| *C09D 183/06* | (2006.01) | |

(52) U.S. Cl.
CPC ............... *C08G 77/12* (2013.01); *C08F 2/24* (2013.01); *C08G 77/20* (2013.01); *C09D 5/022* (2013.01); *C09D 183/06* (2013.01)

(58) Field of Classification Search
CPC .......... C08G 77/12; C08F 2/24; C09D 5/022; C09D 183/06
USPC ...................................... 106/287.15
See application file for complete search history.

(56) References Cited

U.S. PATENT DOCUMENTS

| | | | |
|---|---|---|---|
| 7,038,001 B2 | 5/2006 | Breunig et al. | |
| 8,901,269 B2 | 12/2014 | Marrot et al. | |
| 9,120,935 B2 | 9/2015 | Marrot et al. | |
| 2005/0165194 A1* | 7/2005 | Benayoun | ............... C08L 83/04 |
| | | | 528/10 |

FOREIGN PATENT DOCUMENTS

| | | | | |
|---|---|---|---|---|
| CN | 102702950 A | 10/2012 | | |
| EP | 0904315 A1 | 3/1999 | | |
| EP | 1309647 A1 | 5/2003 | | |
| EP | 1594693 A2 | 11/2005 | | |
| EP | 2563870 A2 | 3/2013 | | |
| JP | H07118537 A | 5/1995 | | |
| WO | 02014407 A1 | 2/2002 | | |
| WO | 2004071765 A2 | 8/2004 | | |
| WO | 2008000771 A1 | 1/2008 | | |
| WO | WO-2008000771 A1 * | 1/2008 | ............... | C08K 5/54 |
| WO | 2011117230 A2 | 9/2011 | | |
| WO | 2012175825 A1 | 12/2012 | | |

OTHER PUBLICATIONS

International Search Report from PCT/EP2018/058261 dated May 23, 2018.

* cited by examiner

*Primary Examiner* — James E McDonough
(74) *Attorney, Agent, or Firm* — McBee Moore & Vanik, IP, LLC

(57) ABSTRACT

The field of the invention is that of the preparation of release and water-repellent coatings on a support, preferably a flexible support, such as a support made of paper or of synthetic polymer film, preferably of the polyolefin, polypropylene, polyethylene or polyester type. The release coatings taken into consideration are more especially those based on silicone elastomer crosslinked after coating on these supports.

11 Claims, No Drawings

PROCESS FOR PRODUCING A WATER-REPELLENT AND RELEASE COATING ON A SUPPORT

CROSS-REFERENCE TO RELATED APPLICATIONS

This application is the National Stage entry of International Application No. PCT/EP2018/058261, filed 29 Mar. 2018, which claims priority to France No. 1700348, filed 30 Mar. 2017.

BACKGROUND

Field

The field of the invention is that of the preparation of release and water-repellent coatings on a support, which is preferably flexible, such as a support made of paper or synthetic polymer film, preferably of the polyolefin, polypropylene, polyethylene or polyester type. The release coatings considered are more especially those based on silicone elastomer crosslinked after coating onto these supports.

DESCRIPTION OF RELATED ART

In this field of application, liquid silicone formulations are applied to support films in industrial coating devices comprising rolls which operate at various speeds. Naturally, it is clear that, in these coating procedures, the higher the speed sought, the more the viscosity of the liquid silicone coating formulation must be meticulously adjusted to the coating operating conditions. For this reason, these liquid silicone coating formulations are sometimes diluted in a solvent. However, for health and safety reasons, the liquid silicone formulation is preferentially used in the form of an aqueous emulsion or dispersion. Thus, once applied to the support film and after removal of the aqueous phase which is usually carried out by heating while maintaining the ambient temperature between 80° C. and 220° C., the silicone emulsion crosslinks to form a release and/or water-repellent silicone elastomer solid coating. Given the high-speed industrial coating rates, the crosslinking kinetics must be high.

Among the flexible supports used that are coated with a silicone release film, mention may for example be made of polymer films for protecting the adhesive face of a self-adhesive or pressure-sensitive adhesive element, this element being made of a polymer film of the polyvinyl chloride (PVC), polyethylene (PE), polypropylene (PP) or polyester, such as polyethylene terephthalate (PET), type, the non-adhesive face of this element generally being printed or printable so that it can be used as a label that can be detached from its support and adhesively bonded by simple pressure on an article to be identified.

In point of fact, in the prior art, it is known that, on this type of support, the adhesion characteristics of crosslinked silicone films are mediocre. These poor adhesion characteristics are further amplified once the speeds of coating/crosslinking of the liquid silicone emulsion increase. Given the fact that industrial coating rates tend to be increased, the crosslinking kinetics must be extremely rapid in order to result in correct crosslinking, that is to say that the silicone release films must be sufficiently crosslinked to be able to perform their release function as well as possible and to have the desirable mechanical qualities. The assessment of the quality of the crosslinking of the silicone release coating can in particular be carried out through the assaying of the non-crosslinked extractable compounds, the amount of which must be as low as possible. For example, the amount of extractables is preferably less than 5%, under normal industrial crosslinking conditions.

The non-adhesion property of the free external face of the silicone coating is expressed through the release force, which must be weak and controlled, for the element intended to be placed on the support coated with the silicone release film. Conventionally, this element may be the adhesive face of a label or of a tape.

Thus, in addition to this weak and controlled non-adhesion, the adhesion of the silicone coating on its support must be very high. This adhesion property is assessed for example using the "rub-off" trade test, which consists in rubbing the surface of the coating with a finger and in measuring the number of successive passes before there is damage to the coating.

Another constraint to be taken into account is that the coefficient of friction of the crosslinked silicone elastomer coating must be controllable, so as to facilitate the operations of rolling up/unrolling the flexible supports made of polymer (in particular of polyester such as PET), which are used as liners for labels.

It is important for this application that the elastomeric silicone coating is not detrimental to the smooth appearance or to the transparency or to the mechanical properties of the support. The transparency is desirable for inspection of the evenness of the film by means of optical detectors.

In a release coating, the control of the release force is significant. Advantageously, this control must be effective at low speed and at high speed. The equilibrium between the low-speed release forces and the high-speed release forces is commonly referred to as the release profile.

Beyond the properties mentioned above, for all supports, the adhesion or the attachment of the silicone coating on the support, measured by the abrasion resistance, should first and foremost be optimal and long-lasting, even in the presence of the adhesive of the label.

In point of fact, in the context of the invention, interest is focused more especially on the kinetics of crosslinking of the silicone coating composition and also on the optimization of the adhesion or attachment of the silicone coating on the support, even when it is subjected to high temperature and humidity conditions, for example 50° C. and 70% relative humidity.

Application EP 1 594 693 describes silicone release compositions having an improved adhesion on paper or polymer supports and comprising, as attachment-promoting additives, organopolysiloxanes bearing at least one epoxy unit or a carboxylic acid anhydride unit and at least one SiH unit. Patent application EP 2 563 870 describes the use of attachment-promoting additives comprising epoxy functional units and SiH units, characterized by an epoxy unit content of less than or equal to 100 mmol/100 g of attachment additive. This epoxy content is described as essential and is exemplified with comparative tests using additives that are similar but the epoxy contents of which are 116 mmol/100 g, 128 mmol/100 g and 181 mmol/100 g, respectively. The comparative tests show problems of demixing of the attachment additive when the epoxy content is greater than 100 mmol/100 g of additive.

SUMMARY

It has now been found that an aqueous silicone emulsion that can be crosslinked by polyaddition reactions after removal of water, comprising an attachment additive which is a specific organopolysiloxane having functional SiH units and epoxy units allows optimum attachment of the silicone coating obtained after coating, removal of water and crosslinking on a support, which is preferably flexible, such as a flexible support made of paper or of a synthetic polymer film such as those of the polyolefin, polypropylene, polyethylene or polyester type.

In this context, an essential objective of the present invention is to provide a novel process for producing a crosslinked silicone coating which is water-repellent and non-adhesive on a support. This crosslinked silicone coating has:
- improved properties of attachment on this type of support by virtue of an attachment-promoting additive,
- sufficient crosslinking to have suitable mechanical and adhesion properties, and
- a low amount of extractable compounds for good persistence of the release properties, favourable in particular for the preparation and the use of the adhesive labels derived from these complexes.

Another objective of the invention is to provide an aqueous silicone emulsion which can be crosslinked into a silicone elastomer by polyaddition reactions and which is of use according to the process of the invention.

These objectives, among others, are achieved by the present invention which relates firstly to a process for producing a water-repellent and release coating on a support S, preferably on a flexible support S made of paper or of synthetic polymer film, comprising the following steps:
1) preparing an aqueous silicone emulsion E1 which can be crosslinked into a silicone elastomer by polyaddition reactions, comprising:
   at least one organopolysiloxane A having, per molecule, at least two unsaturated functional groups of $C_2$-$C_6$ alkenyl type, bonded to the silicon,
   at least one organopolysiloxane B having, per molecule, at least three hydrogen atoms bonded to the silicon,
   at least one polyaddition catalyst C,
   at least one emulsifying agent D,
   water,
   optionally at least one crosslinking inhibitor F,
   optionally at least one pH-fixing agent G chosen so as to maintain the pH of the emulsion E1 between 5 and 9, preferably between 5.5 and 8.5 and even more preferentially between 6 and 8,
   optionally at least one formulation additive H, and
   at least one additive X which is a linear organopolysiloxane comprising siloxyl units (I.1) to (I.3) having the formulae below:

  (I.1)

  (I.2)

  (I.3)

and not comprising units of formula (I.4):

  (I.4)

in which:
a=1 and b=1 or 2;
d=1 and e=1 or 2;
the symbol Y represents a radical comprising a hydrocarbon-based group having from 2 to 20 carbon atoms and an epoxy function, with optionally one or more heteroatoms such as an oxygen atom, preferably the symbol Y is chosen from the radicals consisting of the group: alkyl glycidyl ether, linear branched or cyclic epoxyalkyl, linear, branched or cyclic epoxyalkenyl and carboxylic acid glycidyl ester, and
the symbols $Z^1$, $Z^2$ and $Z^3$, which may be identical or different, represent a monovalent hydrocarbon-based group having from 1 to 30 carbon atoms, preferably chosen from the group consisting of alkyl groups having from 1 to 8 carbon atoms and aryl groups having from 6 to 12 carbon atoms, and even more preferentially chosen from the group consisting of a methyl, ethyl, propyl, 3,3,3-trifluoropropyl, xylyl, tolyl and phenyl group, with the following conditions:
the additive X comprises, per molecule, at least two siloxyl units (I.1) bearing epoxyfunctional hydrocarbon-based groups, at least three siloxyl units (I.3) bearing hydrosiloxyl groups and a total number N of siloxyl units of between 7 and 30, and
the additive X has a content of siloxyl units (I.1) of greater than or equal to 200 mmol per 100 g of additive X;

2) applying on at least one face of said flexible support S the aqueous silicone emulsion E1, and
3) removing the water and carrying out the crosslinking, preferably by heating to a temperature of between 80° C. and 220° C.

DETAILED DESCRIPTION OF A PREFERRED EMBODIMENT

It is to the inventors' credit to have developed and used, in a silicone emulsion which crosslinks by polyaddition reactions, an attachment-promoting additive X, the content of epoxy (siloxyl units (I.1)) of which is greater than or equal to 200 mmol per 100 g of additive X and to obtain:
improved properties of attachment on this type of support by virtue of an attachment-promoting additive,
sufficient crosslinking to have suitable mechanical and adhesion properties, and
a low amount of extractable compounds for good persistence of the release properties, favourable in particular for the preparation and use of the adhesive labels derived from these complexes.

This is all the more creditable since the teaching of the prior art document EP-2563870 describes comparative tests for the same application with silicone formulations without organic or aqueous solvent which use additives having similar structures, but the amounts of epoxy of which are 116 mmol/100 g, 128 mmol/100 g and 181 mmol/100 g. The results exemplified in this document show problems of demixing of the attachment additive when the amount of epoxy is greater than 100 mmol/100 g of additive.

In the present outline, the expression "flexible support" is intended to mean a support which can be bent or folded solely by the force of a person, without breaking or being damaged.

The additive X can be obtained by hydrosilylation of organic synthons comprising at least one hydrocarbon-based ring in which an oxygen atom is included by a linear organopolyhydrosiloxane not comprising units (I.4) as described above. These hydrosilylation reactions can be catalysed by platinum, in particular by carbon-supported platinum as described in patent EP 0 904 315 or by complexes of platinum with carbene ligands as described in patent EP 1 309 647. Preferably, the catalyst used will be a complex of platinum with carbene ligands since the hydrosilylation reaction is better controlled and the storage stability of the additive X obtained is improved.

Preferably, the additive X does not contain alkoxy, vinyl, hydroxyl or methacryloxy functional groups.

It should be noted that the properties of attachment on a support are all the more positive since they endure for a long time, from a few weeks to several months, under severe humidity and temperature conditions.

One advantage linked to the use of an additive X according to the invention in the aqueous emulsion E1 is that it makes it possible to obtain, on a support after application, removal of water and crosslinking, a water-repellent and release crosslinked silicone coating having excellent resistance to abrasion even after accelerated ageing (7 days of storage at 40° C. and under 70% relative humidity).

This additive X according to the invention also has the advantage of prolonged storage, in a non-gelled liquid state, suitable for use in a composition to be deposited on a support so as to form a release coating.

By virtue of the invention, the coatings obtained not only have an excellent attachment ("rub-off"), but also have a sufficiently high release force at high speed and good mechanical and physical properties (smooth appearance, transparency and good coefficient of friction).

The performance achieved by virtue of the invention in terms of quality of the crosslinking by polyaddition: reactivity/level of crosslinking/kinetics, are entirely advantageous, as attested to by the low amounts of extractable compounds obtained, with regard to the reactivity and the level of crosslinking.

The coating obtained is particularly adhesive on the support, makes it possible to provide the release property with respect to adhesives of pressure-sensitive adhesive type, and has excellent mechanical strength on prolonged contact with these adhesives, including acrylic adhesives.

These advantageous features are particularly exploitable for achieving the release of flexible supports which are in the form of a synthetic polymer film and which are of use, for example, as liners of self-adhesive labels (pressure-sensitive adhesive), provided in the form of rolls or spools of films which are e.g. manufactured at very high speed.

In addition, the aqueous silicone coating emulsions used in the process according to the invention do not require the addition of organic solvent. The advantages that this provides as regards health and safety are easily imagined.

According to one advantageous variant of the process according to the invention, in step 1), the aqueous silicone emulsion E1 is prepared by mixing "pre-emulsions" comprising one or more constituents of the aqueous silicone emulsions according to the invention, but which are each incapable of crosslinking separately because of the fact that they do not have all the reactive species and the catalyst required for the polyaddition.

For example, the aqueous silicone emulsion E1 is prepared by mixing:
- a first "pre-emulsion" comprising the organopolysiloxanes A and B, the emulsifying agent D, the crosslinking inhibitor F, water, optionally at least one pH-fixing agent G chosen so as to maintain the pH of the emulsion E1 between 5 and 9 and optionally at least one formulation additive H,
- a catalysing second "pre-emulsion" comprising the polyaddition catalyst C, the emulsifying agent D, the organopolysiloxane, water, optionally at least one pH-fixing agent G chosen so as to maintain the pH of the emulsion E1 between 5 and 9 and optionally at least one formulation additive H, and
- a third "pre-emulsion" comprising the additive X, the emulsifying agent D, water, optionally at least one pH-fixing agent G chosen so as to maintain the pH of the emulsion E1 between 5 and 9 and optionally at least one formulation additive H.

This greatly facilitates the obtaining of a stable emulsion according to the invention which can be easily prepared under industrial conditions.

Preferably, the amount of aqueous silicone emulsion E1 applied on at least one face of said support is determined so as to obtain a support coated with a layer of crosslinked silicone elastomer, the amount of which is between 0.1 $g/m^2$ and 1 $g/m^2$ and preferably about 0.5 $g/m^2$.

In step 2) of the process according to the invention wherein the emulsion is applied, it is advantageous to use a coating technique. Thus, this coating can in particular be carried out using a knife, in particular a knife-over-roll, a floating knife or a knife-over-blanket, or by padding, that is to say by squeezing between two rolls, or else by lick roll, rotary machine, reverse roll, transfer or spraying. One or both faces of the flexible support can be coated, the coating of the two faces then being advantageously carried out by padding. After passage between the rolls, the flexible support is uniformly coated with a fine layer of emulsion. Drying and crosslinking, preferably with hot air or infrared, are then carried out, in particular for 30 s to 5 min, at a crosslinking temperature without exceeding the degradation temperature of the flexible support. When the coating is carried out on a single face, a knife is preferably used. The emulsion is continuously deposited on the upper face of the flexible support, then passes under the knife, before drying and crosslinking as above.

Preferably, the coating is carried out:
by dipping the support in a bath of emulsion as defined above,
then the water is removed and the crosslinking is carried out, preferably under heat activation.

These emulsions can also be applied using known and appropriate means, for example with a knife, with a size-press roll, with an engraved roll or with a gate roll.

The means for heat activation of the crosslinking are conventionally ovens (for example tunnel ovens), hot rolls or even infrared sources. This heat activation can be supplemented by actinic activation and/or by electron bombardment.

The degree of coating is varied according to the intended application. It can for example be less than or equal to 1.2 g of silicone/$m^2$ of support or less than or equal to 0.50 g of silicone/$m^2$ of support.

Preferably, the support S is a flexible support made of paper or of synthetic polymer film. A flexible support S can for example be:
a paper or a polymer film of the polyolefin (polyvinyl chloride (PVC), polypropylene or polyethylene) type or of polyester (polyethylene terephthalate or PET) type, or an adhesive tape, the internal face of which is coated with a layer of pressure-sensitive adhesive and the external face of which is intended to receive the crosslinked silicone release coating.

The supports thus coated can subsequently be brought into contact with any rubber, acrylic or other adhesive materials that are pressure-sensitive. The adhesive material is then easily detachable from said support or material.

Even more preferentially, the support S is a flexible polyester support, such as a flexible polyethylene terephthalate (PET) film.

The crosslinked silicone release coatings according to the invention are well attached, in a long-lasting manner, to the supports, even under drastic humidity and temperature conditions, and on prolonged contact with an acrylic adhesive. They are crosslinked/cured (few extractable compounds). They have a release force profile such that the peel force remains high even at high speed (good release). They are smooth and transparent, which ultimately makes them effective label supports.

Preferably, the additive X has a content of siloxyl units (I.1) of between 0.20 and 0.45 mol/100 g of additive X.

Even more advantageously, the additive X has a content of siloxyl units (I.1) of greater than or equal to 200 mmol per 100 g of additive X and a content of siloxyl units (I.3) of greater than or equal to 300 mmol per 100 g of additive X.

According to an even more advantageous mode, the additive X has:
- a content of siloxyl units (I.1) of between 200 mmol/100 g of additive X and 450 mmol/100 g of additive X, and
- a content of siloxyl units (I.3) of between 300 mmol/100 g of additive X and 850 mmol/100 g of additive X.

In accordance with another preferred arrangement of the invention, in the additive X, the mole ratio between the siloxyl units (I.1) and the siloxyl units (I.3) is between 0.5 and 4, preferably between 0.8 and 3.5 and even more preferentially between 1 and 3.5.

According to another preferred embodiment of the invention, the additive X has a number N1 of siloxyl units (I.1) and a number N3 of siloxy units (I.3) which correspond to the following conditions:
2≤N1≤10 and preferably 3≤N1≤7, and
3≤N3≤20 and preferably 5≤N3≤20.

According to another preferred embodiment of the invention, the additive X has a total number N of siloxyl units of between 7 and 25 limits included and even more preferentially between 7 and 15.

According to another preferred embodiment of the invention, for the siloxyl unit (I.1) of the additive X, the symbol Y is chosen from the group consisting of the groups (R-1) to (R-6) having the following formulae:

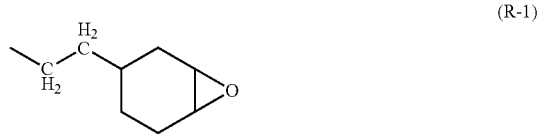

(R-1)

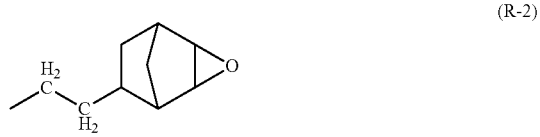

(R-2)

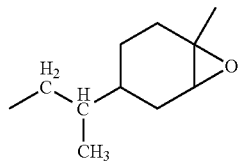

(R-3)

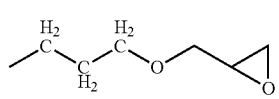

(R-4)

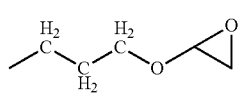

(R-5)

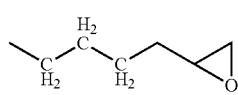

(R-6)

According to one preferential mode, the additive X corresponds to the criteria according to the invention as described above and consists of the siloxyl units chosen from the siloxyl units (I.1) to (I.3) having the following formulae:

$$Y_a Z^1_b SiO_{\frac{4-(a+b)}{2}} \quad (I.1)$$

$$Z^2_3 SiO_{\frac{1}{2}} \quad (I.2)$$

$$H_d Z^3_e SiO_{\frac{4-(d+e)}{2}} \quad (I.3)$$

in which
a=1 and b=1 or 2,
d=1 and e=1 or 2, and
the symbols Y, $Z^1$, $Z^2$ and $Z^3$ are as defined above.

Preferably, the additive X has a dynamic viscosity at 25° C. of between 10 and 700 mPa·s and preferably between 15 and 300 mPa·s.

All the viscosities under consideration in the present disclosure correspond to a "Newtonian" dynamic viscosity magnitude at 25° C., that is to say the dynamic viscosity which is measured, in a manner that is known per se, with a Brookfield viscometer at a shear rate gradient that is low enough for the measured viscosity to be independent of the rate gradient.

From a quantitative point of view, it is advantageous for the content of crosslinking additive X and attachment promoter to be between 0.1% and 10% by weight relative to the total weight of dry extract of the non-aqueous constituents of the emulsion E1 and preferably between 0.1% and 5%.

According to another advantageous mode of the invention, the content of additive X is between 0.1% and 10% by weight relative to the total weight of the emulsion or of the mixture of emulsion E1, and preferably between 0.1% and 5% by weight relative to the total weight of the emulsion or of the mixture of emulsion E1.

The emulsifying agent D is preferably chosen from the group consisting of surfactants, protective colloids and mixtures thereof.

As protective colloids, mention may be made of polyvinyl alcohols (PVAs). By way of anionic surfactant, mention may be made of the following surfactants:

alkyl ester sulfonates of formula $R^a$—CH($SO_3$M)-CO-O$R^b$, wherein $R^a$ represents a $C_6$-$C_{20}$, preferably $C_{10}$-$C_{16}$ alkyl radical, Rb a $C_1$-$C_6$, preferably $C_1$-$C_3$, alkyl radical, and M an alkali metal (sodium, potassium, lithium) cation, a substituted or unsubstituted ammonium (methyl-, dimethyl-, trimethyl-, tetramethylammonium, dimethylpiperidinium) cation or a cation derived from an alkanolamine (monoethanolamine, diethanolamine, triethanolamine), alkyl sulfates of formula $R^c OSO_3 M$, wherein $R^c$ represents a $C_{10}$-$C_{24}$, preferably $C_{12}$-$C_{20}$, alkyl or hydroxyalkyl radical, M representing a hydrogen atom or a cation having the same definition as above, and also the ethoxylated (OE) and/or propoxylated (OP) derivatives thereof, preferably having from 1 to 20 OE units, alkylamide sulfates of formula $R^d CONHR^e OSO_3 M$ wherein $R^d$ represents a $C_2$-$C_{22}$, preferably $C_6$-$C_{20}$, alkyl radical, $R^e$ a $C_2$-$C_3$ alkyl radical, M representing a hydrogen atom or a cation having the same definition as above, and also the ethoxylenated (OE) and/or propoxylenated (OP) derivatives thereof, preferably having 1 to 20 OE units, the salts of saturated or unsaturated $C_8$-$C_{24}$, preferably $C_{14}$-$C_{20}$, fatty acids, $C_9$-$C_{20}$ alkylbenzenesulfonates, and also the ethoxylenated (OE) and/or propoxylenated (OP) derivatives thereof, preferably having 1 to 20 OE units, $C_9$-$C_{20}$ alkylbenzene sulfonates, primary or secondary $C_8$-$C_{22}$ alkyl sulfonates, alkylglycerol sulfonates, the sulfonated polycarboxylic acids described in GB-A-1 082 179, paraffin sulfonates, N-acyl N-alkyl taurates, monoalkyl and dialkyl phosphates, alkyl isethionates, alkyl succinamates, alkyl sulfosuccinates, sulfosuccinate monoesters or diesters, N-acyl sarcosinates, alkyl glycoside sulfates, polyethoxycarboxylates, the cation being an alkali metal (sodium, potassium, lithium), a substituted or unsubstituted ammonium residue (methyl-, dimethyl-, trimethyl-, tetramethylammonium, dimethylpiperidinium) or a derivative of an alkanolamine (monoethanolamine, diethanolamine, triethanolamine).

By way of non-ionic surfactants, mention may be made of poly(alkylene oxide) alkyl or aryl ethers, polyoxyethylenated sorbitan hexastearate, polyoxyethylenated sorbitan oleate and poly(ethylene oxide) cetylstearyl ethers. By way of poly(alkylene oxide) aryl ether, mention may be made of polyoxyethylenated alkylphenols. By way of poly(alkylene oxide) alkyl ether, mention may be made of polyethylene glycol isodecyl ether and polyethylene glycol trimethylnonyl ether containing from 3 to 15 ethylene oxide units per molecule.

By way of example of surfactants, mention may also be made of: ionic, non-ionic or amphoteric fluorinated surfactants and mixtures thereof, for example:

perfluoroalkyls,
perfluorobetaines,
ethoxylated polyfluoroalcohols,
polyfluoroalkylammoniums,
surfactants in which the hydrophilic part contains one or more saccharide unit(s) bearing five or six carbon atoms and in which the hydrophobic part contains a unit of formula $R^f(CH_2)_n$—, in which n=2 to 20 and Rf represents a perfluoroalkyl unit of formula $C_m F_{2m+1}$, in which m=1 to 10; and
polyelectrolytes having fatty perfluoroalkyl side groups.

The term "fluorinated surfactant" is intended to mean, as is entirely known per se, a compound made up of an aliphatic perfluorocarbon-based part, comprising at least three carbon atoms, and an ionic, non-ionic or amphoteric hydrophilic part. The perfluorocarbon-based part having at least three carbon atoms may represent either all, or only a fraction, of the fluorocarbon-based part of the molecule. With regard to this type of compound, a large number of references are found in the literature. Those skilled in the art may refer in particular to the following references:

FR-A-2 149 519, WO-A-94 21 233, U.S. Pat. No. 3,194,767, the book "Fluorinated Surfactants", Erik Kissa, published by Marcel Dekker Inc. (1994) Chapter 4, in particular Tables 4.1 and 4.4.

Mention may in particular be made of the products sold by the company Du Pont under the name Zonyl®, for example FSO, FSN-100, FS-300, FSD, and also the fluorinated surfactants known as Forafac® distributed by the company Du Pont and the products sold under the name Fluorad® by the company 3M.

Among these surfactants, mention will in particular be made of anionic, cationic, non-ionic and amphoteric perfluoroalkylated compounds, and among them, more particularly, the surfactants of the class of Zonyl® sold by Du Pont, sold by Du Pont respectively under the names Zonyl® FSA, Zonyl® FSO, Zonyl® FSC and Zonyl® FSK.

The following may also be specified with respect thereto:
Zonyl® FSO 100: CAS 65545-80-4, (non-ionic) 99% to 100%, the remainder being 1,4-dioxane,
Zonyl® FSN: CAS 65545-80-4, 99% to 100%, the remainder being sodium acetate and 1,4-dioxane,
Zonyl® FS-300: CAS 65545-80-4, 40%, the remainder being 1,4-dioxane (<0.1%) and water
Zonyl® FSD: CAS 70983-60-7 30%, (cationic), the remainder being hexylene glycol (10%), sodium chloride (3%) and water (57%).

Mention may also be made of:
perfluoroalkyl betaines (amphoteric) such as that sold by Du Pont under the name Forafac® 1157, ethoxylated polyfluoroalcohols (non-ionic), such as that sold by Du Pont under the name Forafac 1110 D, polyfluoroalkylammonium salts (cationic), such as that sold by Du Pont under the name Forafac 1179;
surfactants in which the hydrophilic part contains one or more saccharide unit(s) containing from 5 to 6 carbon atoms (units derived from sugars such as fructose, glucose, mannose, galactose, talose, gulose, allose, altose, idose, arabinose, xylose, lyxose and/or ribose) and in which the hydrophobic part contains a unit of formula $R^F(CH_2)_n$, where n may range from 2 to 20, preferably from 2 to 10 and $R^F$ represents a perfluoroalkyl unit of formula $C_m F_{2m+1}$ with m possibly ranging from 1 to 10, preferably from 4 to 8, chosen from those having the features defined above; mention may be made of monoesters of perfluoroalkylated fatty acids and of sugars such as sucrose, it being possible for the monoester function to be represented by the formula $R^F(CH_2)_n C(O)$, where n may range from 2 to 10 and $R^F$ represents a perfluoroalkyl unit of formula $C_m F_{2m+1}$ with m possibly ranging from 4 to 8, described in Journal of the American Oil Chemists' Society (JAOCS), Vol. 69, No. 1 (January 1992) and chosen from those having the features defined above; and
polyelectrolytes having fatty perfluoroalkyl side groups, such as polyacrylates having $R^F(CH_2)_n$ groups where n may range from 2 to 20, preferably from 2 to 10 and $R^F$ represents a perfluoroalkyl unit of formula $C_m F_{2m+1}$ with m possibly ranging from 1 to 10, preferably from 4 to 8, chosen from those having the features defined above; mention may be made of polyacrylates having —CH$_2$C$_7$F$_{15}$ groups described in J. Chim. Phys. (1996) 93, 887-898 and chosen from those having the features defined above.

The amount of emulsifying agent depends on the type of each of the constituents present and also on the very nature of the emulsifying agent used. As a general rule, the emulsion comprises from 0.5% to 10% by weight of emulsifying agent relative to the total weight of the emulsion (even better still from 0.5% to 7% by weight).

The water is preferably present in proportions of between 10% and 90% and preferably between 20% and 60% by weight relative to the total weight of the emulsion.

Moreover, conventionally, use may also be made, in the emulsions, of antifoam adjuvants, biocides, rheology modifiers, coalescence agents, dispersing agents, acidifying agents, neutralizers, bases and/or thickeners. The concentrations of such adjuvants are known to those skilled in the art.

Throughout the present document, reference will be made to elements having conventional nomenclature to denote the siloxyl units M, D, T, Q of the organopolysiloxanes. By way of reference work, mention may be made of: Noll "*Chemistry and Technology of Silicones*", chapter 1.1, pages 1-9, Academic Press, 1968-2nd edition.

According to one embodiment of the invention, the organopolysiloxane A comprises:

at least two siloxyl units (I.5) having the formula below:

in which:
a=1 or 2, b=0, 1 or 2 and a+b=1, 2 or 3;
W independently represents an alkenyl group, preferably having from 2 to 6 carbon atoms and, even more preferentially, a vinyl or allyl group, and
Z independently represents a monovalent hydrocarbon-based group having from 1 to 30 carbon atoms and preferably chosen from the group consisting of alkyl groups having from 1 to 8 carbon atoms inclusive and aryl groups, and even more preferentially chosen from the group consisting of a methyl, ethyl, propyl, 3,3,3-trifluoropropyl, xylyl, tolyl and phenyl radical, and at least one siloxyl unit (I.6) of formula:

in which:
a=0, 1, 2 or 3, and
Z$^1$ independently represents a monovalent hydrocarbon-based group having from 1 to 30 carbon atoms and preferably chosen from the group consisting of alkyl groups having from 1 to 8 carbon atoms inclusive and aryl groups, and even more preferentially chosen from the group consisting of a methyl, ethyl, propyl, 3,3,3-trifluoropropyl, xylyl, tolyl and phenyl radical.

According to one preferred embodiment, in formula (I.5), a=1 and a+b=2 or 3 and in formula (I.6), c=2 or 3. It is understood, in formulae (I.5) and (I.6) above, that, if several W and Z radicals are present, they may be identical to or different from one another.

The organopolysiloxane A preferably has a linear, optionally cyclic, structure. These linear organopolysiloxanes generally have a dynamic viscosity at 25° C. of between 50 mPa·s and 100,000 mPa·s and more preferentially between 50 mPa·s and 50,000 mPa·s and even more preferentially between 50 mPa·s and 20,000 mPa·s.

When the organopolysiloxanes are linear organopolysiloxanes, they can be chosen from the group consisting of:
polydimethylsiloxanes with dimethylvinylsilyl end groups;
poly(vinylmethylsiloxane-co-dimethylsiloxane)s with dimethylvinylsilyl end groups; and
poly(dimethylsiloxane-co-vinylmethylsiloxane)s with trimethylsilyl end groups.

The organopolysiloxane B is preferably an organopolysiloxane comprising at least three siloxyl units of formula (I.7) and optionally siloxyl units (I.8) having the formulae below:

in which:
a=1 or 2, b=0, 1 or 2 and a+b=1, 2 or 3;
H represents a hydrogen atom,
L$^1$ independently represents a monovalent hydrocarbon-based group having from 1 to 30 carbon atoms and preferably chosen from the group consisting of alkyl groups having from 1 to 8 carbon atoms inclusive and aryl groups, and even more preferentially chosen from the group consisting of a methyl, ethyl, propyl, 3,3,3-trifluoropropyl, xylyl, tolyl and phenyl radical, and
c=0, 1, 2 or 3,
Z$^1$ independently represents a monovalent hydrocarbon-based group having from 1 to 30 carbon atoms and preferably chosen from the group consisting of alkyl groups having from 1 to 8 carbon atoms inclusive and aryl groups, and even more preferentially chosen from the group consisting of a methyl, ethyl, propyl, 3,3,3-trifluoropropyl, xylyl, tolyl and phenyl radical.

The dynamic viscosity of the organopolysiloxane B is greater than or equal to 5, preferably greater than or equal to 10, and even more preferentially is between 20 and 1000 mPa·s.

The organopolysiloxane B may have a linear, branched or cyclic structure. The degree of polymerization is greater than or equal to 2. More generally, it is less than 5,000.

Examples of hydrosiloxyl units of formula (I.7) are:
M': H(CH$_3$)$_2$SiO$_{1/2}$,
D': HCH$_3$SiO$_{2/2}$, and
D'$^{Ph}$ with phenylated group: H(C$_6$H$_5$)SiO$_2$/2.

Useful examples of organopolysiloxane B are:
M'2D$_x$D'$_y$: dimethylpolysiloxanes with hydrodimethylsilyl, poly(dimethylsiloxane) (methylhydrosiloxy) α,ω-dimethylhydrosiloxane end groups,
M$_2$D$_x$D'$_y$: copolymers comprising dimethylhydromethylpolysiloxanes (dimethyl) units with trimethylsilyl end groups,
M'2D$_x$D'$_y$: copolymers comprising dimethylhydromethylpolysiloxane units with hydrodimethylsilyl end groups, $M_2D_x$: hydromethylpolysiloxanes with trimethylsilyl end groups,
$D'_4$: cyclic hydromethylpolysiloxanes,
with x and y being integers or decimals (mean value) which vary according to the structure used, determined according to the usual techniques in the technical field. For example, x and y may range between the numbers 1 and 500.

The polyaddition catalysts C are also well known. Use is preferably made of platinum and rhodium compounds. Use may in particular be made of complexes of platinum and of an organic product described in patents U.S. Pat. Nos. 3,159,601, 3,159,602, 3,220,972 and European patents EP-A-0 057 459, EP-A-0 188 978 and EP-A-0 190 530, the complexes of platinum and of vinyl organosiloxanes described in patents U.S. Pat. Nos. 3,419,593, 3,715,334, 3,377,432 and 3,814,730. The polyaddition catalyst C that is generally preferred is platinum. In this case, the weight amount of polyaddition catalyst C, calculated by weight of platinum metal, is generally between 2 and 400 ppm, preferably between 5 and 200 ppm based on the total weight of the components of the emulsion with the water being omitted (dry extract).

According to one particular embodiment, the amounts of the constituents are such that the [≡SiH]/[≡SiAlkenyl] mole ratio is between 0.5 and 7 and preferably between 1 and 5 with:
[≡SiH]=total number of moles of siloxyl units comprising a hydrogen atom bonded to the silicon, and
[≡SiAlkenyl]=total number of moles of siloxyl units comprising an alkenyl radical bonded to the silicon.

The crosslinking inhibitor F (or addition reaction retarder) can, for its part, be chosen from the following compounds:
an organopolysiloxane, which is advantageously cyclic, and substituted with at least one alkenyl, tetramethylvinyltetrasiloxane being particularly preferred,
pyridine,
organic phosphines and phosphites,
unsaturated amides,
alkyl maleates,
and acetylenic alcohols.

These acetylenic alcohols (cf. FR-B-1 528 464 and FR-A-2 372 874), which form part of the preferred hydrosilylation reaction thermal blockers, have the formula:

$(R^1)(R^2)C(OH)—C≡CH$ in which formula:
$R^1$ is a linear or branched alkyl radical or a phenyl radical;
$R^2$ is a hydrogen atom, a linear or branched alkyl radical, or a phenyl radical;
the $R^1$, $R^2$ radicals and the carbon atom located in the alpha position with respect to the triple bond being able to optionally form a ring; and
the total number of carbon atoms contained in $R^1$ and $R^2$ being at least 5, preferably from 9 to 20.

Said alcohols are preferably chosen from those which have a boiling point greater than 250° C. By way of examples, mention may be made of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercial products. Such a crosslinking inhibitor is present in a proportion of at most 4,000 ppm, preferably in a proportion of from 100 to 3500 ppm relative to the total weight of the constituents of the emulsion, excluding the weight of the water (dry extract).

The pH-fixing agent G can advantageously be a buffer system which, even more advantageously, comprises the pair $HCO_3^-/CO_3^{2-}$ and/or $H_2PO_4^-/HPO_4^{2-}$. Reference may also be made to international PCT application WO 99/35181.

As formulation additive H, mention may be made of:
a bactericidal agent such as, for example, sorbic acid,
an antifreeze and/or wetting agent such as, for example, glycols such as propylene glycol or ethylene glycol,
an antifoam,
a filler, preferably a mineral filler, chosen from siliceous or non-siliceous materials, siliceous fillers being more particularly preferred,
a dye or pigment;
an acidifying agent such as, for example, acetic acid.

With regard to the siliceous fillers, it should be noted that they can act as a reinforcing or semi-reinforcing filler. The reinforcing siliceous fillers are chosen from colloidal silicas, fumed silica and precipitated silica powders, or a mixture thereof. These powders have a mean particle size generally of less than 0.1 mm and a BET specific surface area of greater than or equal to 50 $m^2/g$, preferably between 150 and 350 $m^2/g$. Semi-reinforcing siliceous fillers such as diatomaceous earths or ground quartz can also be used. With regard to non-siliceous mineral materials, they can be involved as semi-reinforcing or bulking mineral fillers. Examples of these non-siliceous fillers that can be used alone or as a mixture are carbon black, titanium dioxide, aluminium oxide, aluminium hydrate, expanded vermiculite, non-expanded vermiculite, calcium carbonate, zinc oxide, mica, talc, iron oxide, barium sulfate and slaked lime. These fillers have a particle size generally of between 0.001 and 300 mm and a BET surface area of less than 100 $m^2/g$.

The aqueous silicone emulsion E1 can also include another attachment-promoting additive. The latter is preferably chosen from epoxyfunctional silanes, preferably from the group comprising:
(3,4-epoxycyclohexyl)ethyltriethoxysilane [Coatosil® 1770],
tris(3-(trimethoxysilyl)propyl)isocyanurate [A-Link 597],
(gamma-glycidoxypropyl)trimethoxysilane [Dynasilan® Glymo],
(gamma methacryloxypropyl)trimethoxysilane [Dynasilan® Memo],
silicone compounds comprising both SiVi groups and epoxyfunctional groups, and
mixtures thereof.

The suitable concentrations of this other attachment-promoting additive are, for example, between 0.5% and 5%, preferably between 1% and 3% by weight relative to the total weight of the constituents of the emulsion, excluding the weight of the water (dry extract).

The preparation of the aqueous silicone emulsion according to the invention, that can be used in particular as a coating base for producing release and water-repellent coatings, consists simply in mixing the constituents according to the invention using mixing means and methods known to those skilled in the art.

The final subject of the invention relates to the aqueous silicone emulsion E1 which can be crosslinked into a silicone elastomer by polyaddition reactions according to the invention and as described above.

The following examples are given by way of indication and cannot be considered to be a limit of the field and of the spirit of the invention.

EXAMPLES

I—Preparation of the Attachment Additives X:
Various additives were synthesized, consisting of:
n units $YCH_3SiO_{2/2}$
m units $HCH_3SiO_{2/2}$
p units $(CH_3)_2SiO_{2/2}$
2 units $(CH_3)_3Si_{1/2}$
wherein Y is the epoxy group having the formula below:

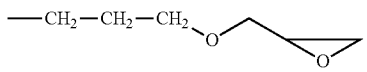

Additive X1

181.0 g of toluene are introduced, under nitrogen, into a 1 l reactor. The medium is stirred and heated to 85° C. When the temperature is reached, 10.2 mg of a platinum-carbene complex, sold by Umicore under the trade name Umicore HS432®, are introduced. A mixture of allyl glycidyl ether (AGE) (236.8 g, 2.07 mol) and of a polymethylhydrosiloxane H2 with 9 $(CH_3)HSiO_{2/2}$ units and two $(CH_3)_3SiO_{1/2}$ end units (363.2 g, SiH=4.77 mol) is then added dropwise over the course of 4 hours. After returning to ambient temperature, the reaction medium is devolatilized at 25-30° C. under 0-3 mbar for 30 min, then at 85° C. (setpoint) under 1 mbar for 3 h, to give a functionalized silicone oil composed of n $YCH_3SiO_{2/2}$ units, m $HCH_3SiO_{2/2}$ units and two $(CH_3)_3Si_{1/2}$ units with the following characteristics: n+m=9; [SiH]=586 mmol/100 g; [Epoxy]=291 mmol/100 g; Viscosity=32 mPa·s.

Additive X2

50.3 g of toluene and 472 mg of Pt/C are introduced, under nitrogen, into a 500 ml round-bottomed flask. This mixture is magnetically stirred and heated to 90° C. A mixture of allyl glycidyl ether (AGE) (46.4 g, 0.40 mol) and of a polymethylhydrosiloxane H2 with 9 $(CH_3)HSiO_{2/2}$ units and two $(CH_3)_3SiO_{1/2}$ end units (100.22 g, SiH=1.35 mol) is added dropwise over the course of 47.5 min. When the addition has ended, the heating is maintained overnight. After returning to ambient temperature, the reaction medium is filtered through cardboard and Teflon, then treated with 2S black at 60° C. for 6 h and then again filtered. The treatment with the black is repeated. The reaction medium is then devolatilized at 80° C. (setpoint) under 1 mbar for 3 h, to give a functionalized silicone oil composed of n $YCH_3SiO_{2/2}$ units, m $HCH_3SiO_{2/2}$ units and two $(CH_3)_3Si_{1/2}$ units with the following characteristics: n+m=9, [SiH]=720 mmol/100 g; [Epoxy]=219 mmol/100 g; Viscosity=27 mPa·s.

Additive X3

105.1 g of toluene and 11 mg of a platinum-carbene complex, sold by Umicore under the trade name Umicore HS432® are introduced, under nitrogen, into a 500 ml round-bottomed flask. This mixture is magnetically stirred and heated to 85° C. A mixture of allyl glycidyl ether (AGE) (249.2 g, 2.18 mol) and of polymethylhydrosiloxane H3 comprising 20 $(CH_3)HSiO_{2/2}$ units and two $(CH_3)_3SiO_{1/2}$ end units (302.6 g, SiH=4.52 mol) is added dropwise over the course of 3 hours. When the addition has ended, the dropping funnel is rinsed with 45.4 g of toluene and the heating is maintained for 2 hours. After returning to ambient temperature, the reaction medium is devolatilized at 92° C. under 1 mbar for 3 hours, to give a functionalized silicone oil (449.0 g) composed of n $YCH_3SiO_{2/2}$ units, m $HCH_3SiO_{2/2}$ units and two $(CH_3)_3Si_{1/2}$ units with the following characteristics: n+m=20, [SiH]=568 mmol/100 g; [Epoxy]=324.3 mmol/100 g; Viscosity=186 mPa·s.

TABLE 1

Summary of the attachment additives

| Attachment additive | Total number of siloxyl units | Number of $(CH_3)_2SiO_{2/2}$ units | [SiH] mmol/100 g | [Epoxy] mmol/100 g | [SiH]/[Epoxy] |
|---|---|---|---|---|---|
| X1 | 11 | 0 | 586 | 291 | 2.0 |
| X2 | 11 | 0 | 720 | 219 | 3.3 |
| X3 | 22 | 0 | 568 | 324 | 1.8 |

II) Constituents of the Emulsions 1-ethynyl-1-cyclohexanol (ECH, crosslinking inhibitor F1)

Mixture POS-Vi A30 containing:
  i) 75% by weight of a polydimethylsiloxane A1 (viscosity 450 mPa·s) bearing chain-end vinyls and a mean of 9 vinyls in the chain,
  ii) 25% by weight of a polydimethylsiloxane A2 (viscosity 10,000 mPa·s) bearing only chain-end vinyls
  iii) 3000 ppm of 1-ethynyl-1-cyclohexanol (ECH, crosslinking inhibitor F1)

Mixture POS-Vi A88 containing:
  i) 88% by weight of a polydimethylsiloxane A1 (viscosity 450 mPa·s) bearing chain-end vinyls and a mean of 9 vinyls in the chain,
  ii) Approximately 12% of a vinylated oil of 600 mPa·s bearing only chain-end vinyls, and
  iii) 2600 ppm of 1-ethynyl-1-cyclohexanol (ECH, crosslinking inhibitor F1)

Mixture POS-Vi A67 containing:
  i) A polydimethylsiloxane A3 of mean structure $M^{Vi}D_{109}D^{Vi}M^{Vi}$, and
  ii) 0.15% by weight of 1-ethynyl-1-cyclohexanol (ECH, crosslinking inhibitor F1)
  With $M^{Vi}$: $(vinyl)(CH_3)_2SiO_{1/2}$, $D^{Vi}(vinyl)(CH_3)SiO_{2/2}$ 621V600: polydimethylsiloxane A3 (viscosity 600 mPa·s) bearing only chain-end vinyls;

ADD X1: Attachment additive X1

XL: poly(hydromethylsilyl)dimethylsiloxane B1 of mean structure: $MD'_{51}D_{20}M$
  With: $D'=H(CH_3)SiO_{2/2}$ PVA: Polyvinyl alcohol, grade Poval 26-88, from Kuraray, partially hydrolysed poly(vinyl acetate) in an amount of 88%.

TR15: Surfactant (Rhodasurf TR15/40 from the company Solvay): ethoxylated tridecyl fatty alcohol comprising on average 15 ethylene oxide units, and supplied in the form of an aqueous solution at 40% by weight.
ROX: Surfactant which is an ethoxylated (8 ethoxy units) fatty alcohol (chain of 13 carbons), sold under the name Rox® by the company Solvay.
G1: pH-fixing agent: $NaHCO_3$.
H1: sorbic acid formulation additive.
Pt: polyaddition platinum catalyst.

III) Preparation of the Pre-Emulsions

TABLE 2

Preparation of the pre-emulsions (in parts by weight)

| Emulsions | E02 | E08 | E03 | E66 | TW2416 | TW2417 | TW2418 |
|---|---|---|---|---|---|---|---|
| POS-Vi A67 | 36.54 | 0.00 | 0.00 | 0.00 | 0.00 | 0.00 | 0.00 |
| POS-Vi A88 | 0.00 | 33.47 | 0.00 | 0.00 | 0.00 | 0.00 | 0.00 |
| 621V600 | 0.00 | 0.00 | 39.60 | 0.00 | 0.00 | 0.00 | 0.00 |
| POS-Vi A30 | 0.00 | 0.00 | 0.00 | 0.00 | 38.67 | 38.81 | 0.00 |
| ADD X1 | 0.00 | 0.00 | 0.00 | 0.00 | 0.00 | 0.00 | 38.61 |
| XL | 2.60 | 5.42 | 0.00 | 40.93 | 0.00 | 0.00 | 0.00 |
| PVA | 1.99 | 2.06 | 2.07 | 2.09 | 1.97 | 1.96 | 1.98 |
| TR15 | 0.00 | 0.00 | 0.00 | 0.00 | 0.085 | 0.083 | 0.084 |
| ROX | 0.00 | 0.33 | 0.00 | 0.00 | 0.00 | 0.00 | 0.00 |
| Water | 58.83 | 58.67 | 57.38 | 56.95 | 59.22 | 59.09 | 59.27 |
| H1 | 0.04 | 0.04 | 0.01 | 0.04 | 0.055 | 0.055 | 0.056 |
| G1 | 0.00 | 0.00 | 0.91 | 0.00 | 0.00 | 0.00 | 0.00 |
| Pt | 0.00 | 0.00 | 0.03 | 0.00 | 0.00 | 0.00 | 0.00 |

The pre-emulsions TW2416 and TW2417 are obtained in the following way:

The PVA, previously dissolved in a proportion of 10% in water, the Rhodasurf TR15/40 surfactant and the sorbic acid are introduced into a 2-litre stirred reactor equipped with a scraping anchor and a baffle. After a few minutes of stirring at 100 rpm, the stirring is maintained and the POS-Vi A30 mixture is gradually introduced over the course of 1 hour, then the stirring is prolonged for 1 h30 using a rotor-stator of Ultra-turrax type at the speed of 11,000 rpm. Finally, the remainder of the water is gradually introduced over the course of approximately 2 h. The emulsion obtained has a mean particle size of approximately 1.0 µm, measured by laser scattering by means of a Malvern Mastersizer 3000 particle size analyser.

The pre-emulsion TW2418 is obtained in the following way:

The PVA, previously dissolved in a proportion of 10% in water, the Rhodasurf TR15/40 surfactant and the sorbic acid are introduced into a 250 ml stirred reactor equipped with a scraping anchor and a baffle. After a few minutes of stirring at 50 rpm, flushing with nitrogen is established in the headspace of the reactor, the stirring is maintained and the additive 384 is gradually introduced over the course of 35 min, then the stirring is prolonged for 30 min. Finally, the remainder of the water is gradually introduced over the course of approximately 30 min. The emulsion obtained has a mean particle size of approximately 1.1 µm, measured by laser scattering by means of a Malvern Mastersizer 3000 particle size analyser.

IV) Preparation of the Emulsions

The emulsions are formulated by mixing the pre-emulsions described in Table 2 so that a coating "bath" is obtained. The formulas expressed in parts (weight) are collated in Table 3 below:

TABLE 3

Preparation of pre-emulsions (in parts by weight)

| Pre-emulsions | Comparative Emulsion A | Comparative Emulsion B | Invention Emulsion C | Invention Emulsion D | Comparative Emulsion E |
|---|---|---|---|---|---|
| E02 | | | | | 100.0 |
| E08 | 100.0 | | | | |
| TW2416 | | 100.0 | 100.0 | 100.0 | |
| TW2418 | | | 2.0 | 5.0 | |
| E66 | | 15.0 | 14.0 | 12.5 | |
| E03 | 16.5 | 20.5 | 20.5 | 20.7 | 16.7 |
| Water* | 105.0 | 45.0 | 45.0 | 45.0 | 185.0 |

*The amount of water is determined with the aim of adjusting the silicone deposit during the subsequent processing steps.

V) Processing for Preparation of a Silicone Coating on a Support

A PET film (Toray 6001) is coated with the emulsions A to E (described in Table 3), and dried at 210° C. at the speed of 25 m/min in a drier 6 metres long. The silicone deposit is determined by X-ray fluorescence; the deposit targeted is approximately 0.5 g/m². Prior to the coating, the film is optionally treated, on line, by means of a Corona treatment with a power of 700 W per 40 cm of machine width.

VI) Characterization of the Silicone Coatings

Tests Carried Out on the Supports Coated with Silicone Release Coatings

Deposit: Control of the silicone deposit coated onto the surface by X-ray fluorescence analysis of the silicon (Lab-X 3000 from Oxford). An X-ray tube excites the electron layer of the silicon atoms, thereby bringing about an emission of X-rays proportional to the amount of silicon excited. This value or number of counts is converted by calculation (using the calibration straight line) into amount of silicone.

Smear: Qualitative control of the surface polymerization by the finger trace method which consists in:
- Placing the sample of silicone-coated support to be controlled on a flat, rigid surface;
- Making a trace with the tip of the finger by pressing moderately but firmly; and
- Examining by eye the trace thus made, preferably in raking light. It is thus possible to see the presence of even a very light trace by the difference in surface sheen.

The assessment is qualitative. The "Smear" is quantified with the following scorings:
- A: very good, no finger trace
- B: not quite so good, trace barely visible
- C: clear trace
- D: trace very clear and oily appearance of the surface, product barely polymerized, that is to say a score of A to D, from the best result to the worst.

Rub-off: Control of the ability of the silicone to adhere to the flexible support by scrubbing by passing the finger to and fro, which consists in:
- Placing the sample of silicone-coated support to be controlled on a flat, rigid surface, the silicone being on the upper face;
- Passing the tip of a finger to and fro (over a length of approximately 10 cm) 10 times, pressing moderately but firmly;
- Examining by eye the appearance of the scrubbing. Scrubbing corresponds to the appearance of a fine white powder or small balls which roll beneath the finger.

The assessment is qualitative. The scrubbing is quantified with the following scorings:
- 10: very good, no appearance of scrubbing after 10 movements to and fro
- 1: very poor, scrubbing from the first movement The score corresponds to the number of movements to and fro (from 1 to 10) starting from which scrubbing appears.

That is to say a score from 1 to 10, from the worst to the best result.

Dewetting: Assessment of the degree of polymerization of the silicone layer by evaluating the transfer of silicone onto an adhesive brought into contact with the coating using an ink with standardized surface tension. The method is as follows:
- Select a sample of approximately 20×5 cm of the silicone-coated paper to be characterized, taken in the direction of unwinding (machine direction);
- Cut a length of ≈15 cm of adhesive tape, then deposit it with the adhesive side on the paper to be controlled, without folds, while exerting pressure ten times by sliding the finger along the length of the adhesive tape ("Scotch" adhesive tape from 3 M, reference 610, width: 25 mm);
- Remove the adhesive tape and deposit it flat, adhesive part upwards;
- Using a (disposable) cotton bud, deposit a trace of ink on the adhesive part of the tape over a length of approximately 10 cm (inks of Sherman or Ferarini and Beneli brand with a surface tension ≈30 dynes/cm and a viscosity of 2 to 4 mPa/s). Immediately start the timer;
- It is considered that the phase of the dewetting phenomenon is entered when the ink trace changes in appearance, then stop the timer;
- The ink must be deposited on the adhesive-coated part of the tape within 2 minutes following the silicone coating;
- If the result obtained is <10 seconds, it is considered that there is migration of silicone on the adhesive, and that the polymerization is not complete;
- A score of 0 to 10 corresponding to the time elapsed in seconds before the observation of the dewetting phenomenon will be given;
- If the result obtained is 10 seconds, it is considered that the polymerization is complete. In this case, a score of 10, meaning that the result is very good, will be given;
- Note the score obtained and the ink used (name, brand, surface tension, viscosity).

Extractables: Measurement of the amount of silicone that is not grafted to the network formed during polymerization. These silicones are extracted from the film by sample immersion on leaving the machine, in MIBK for a minimum of 24 h. This is measured by flame absorption spectroscopy. It should be recalled that a low content (%) of extractables is sought (sign of a thorough polymerization).

Preparation of Self-Adhesive Multilayer Articles

A standardized adhesive-coated support TESA7475 (support=PET–adhesive=acrylic) or TESA4651 is complexed on the silicone liner produced above (=support coated with a silicone coating obtained by crosslinking under UV) in order to form a multilayer article.

Release force: The peel force measurements were carried out with the TESA 7475 standardized adhesive. The test specimens of the multilayer article (adhesive in contact with silicone surface) were stored for 1 day at 23° C., 1 day to 70° C. and 7 days at 70° C. under the required pressure conditions, then tested at low peel speed according to the FINAT 3 (FTM 3) test known to those skilled in the art.

The release force is expressed in g/cm and is measured using a dynamometer, after having placed the samples under pressure either at ambient temperature (23° C.) or at a higher temperature for accelerated ageing tests (in general 70° C.).

Release force: the test used corresponds to the Finat standards no. 3 and 10 of edition no. 5 of 1999. This test is carried out 4 days after the crosslinking ("off line") with adhesive tapes sold under the brand Tesa® 7475 at 23° C. (acrylic base), and Tesa® 7476 at 70° C. (rubber base).

TABLE 4

| Emulsion coated | Corona treatment | Silicone deposit (g/m$^2$) | Dewetting | Smear | Extractables (%) |
|---|---|---|---|---|---|
| A (Comparative) | no | 0.58 | 10 | A | 0.2 |
| A (Comparative) | yes | 0.58 | 10 | A | 0.5 |
| B (Comparative) | no | 0.55 | 10 | B | 0.7 |
| B (Comparative) | yes | 0.55 | 10 | B | 0.5 |
| C (Invention) | no | 0.43 | 10 | A | 0.3 |

TABLE 4-continued

| Emulsion coated | Corona treatment | Silicone deposit (g/m²) | Dewetting | Smear | Extractables (%) |
|---|---|---|---|---|---|
| C (Invention) | yes | 0.43 | 10 | A | 0.5 |
| D (Invention) | no | 0.57 | 10 | A | 0.5 |
| D (Invention) | yes | 0.57 | 10 | A | 0.0 |
| E (Comparative) | no | 0.48 | 1 | B | 1.1 |
| E (Comparative) | yes | 0.48 | 1 | A | 2.8 |

Release as a function of ageing (24 hours and 10 days).

TABLE 5

| | | Release force | | | |
|---|---|---|---|---|---|
| | | Tesa 7475 −23° C.-70 g/cm²- (g/cm) | | Tesa 4651 −23° C.-70 g/cm²- (g/cm) | |
| Emulsion coated | Corona treatment of the support | 24 hours | 10 days | 24 hours | 10 days |
| A (Comparative) | no | 18 | 18 | 22 | 18 |
| A (Comparative) | yes | 19 | 19 | 19 | 19 |
| B (Comparative) | no | 20 | 18 | 19 | 18 |
| B (Comparative) | yes | 19 | 19 | 19 | 19 |
| B (Comparative) | no | 20 | 21 | 19 | 19 |
| C (Invention) | yes | 20 | 20 | 19 | 9 |
| D (Invention) | no | 44 | 44 | 25 | 26 |
| D (Invention) | yes | 21 | 23 | 19 | 18 |
| E (Comparative) | no | 21 | 23 | 17 | 17 |
| E (Comparative) | yes | 21 | 23 | 17 | 16 |

Attachment:

After coating with the emulsions A, B, C, D and E, the coatings are conditioned in a controlled atmosphere, at 70% relative humidity and at 40° C. They are then tested from the point of view of their rub off; to do this, the surface is rubbed with a finger and the number of rubbing movements after which a trace appears is recorded; this number serves as a score. In the case where 10 passes cause no trace to appear, the maximum score of 10 is given. This measurement is repeated several times over time (ageing).

TABLE 6

| | | Rub-off | | |
|---|---|---|---|---|
| | | Ageing time | | |
| Emulsion coated | Corona treatment of the support | 0 days | 3 days 40° C. and 70% RH | 3 days 40° C. and 70% RH |
| A (Comparative) | no | 10 | 10 | 5 |
| A (Comparative) | yes | 10 | 10 | 9 |
| B (Comparative) | no | 10 | 10 | 10 |
| B (Comparative) | yes | 10 | 10 | 10 |
| C (Invention) | no | 10 | 10 | 10 |
| C (Invention) | yes | 10 | 10 | 10 |
| D (Invention) | no | 10 | 10 | 10 |
| D (Invention) | yes | 10 | 10 | 10 |
| E (Comparative) | no | 5 | 2 | 2 |
| E (Comparative) | yes | 10 | 10 | 10 |

Observation: the transparency of the coating obtained with emulsion C is excellent.

The invention claimed is:

1. A process for producing a water-repellent and release coating on a support S, optionally on a flexible support S comprising paper or of synthetic polymer film, the process comprising:

1) Preparing an aqueous silicone emulsion E1 which can be crosslinked into a silicone elastomer by a polyaddition reaction, comprising:
   at least one organopolysiloxane A having, per molecule, at least two unsaturated functional groups of $C_2$-$C_6$ alkenyl type, bonded to the silicon,
   at least one organopolysiloxane B having, per molecule, at least three hydrogen atoms bonded to the silicon,
   at least one polyaddition catalyst C,
   at least one emulsifying agent D,
   water,
   optionally at least one crosslinking inhibitor F,
   optionally at least one pH-fixing agent G chosen so as to maintain the pH of the emulsion E1 between 5 and 9
   optionally at least one formulation additive H, and
   at least one additive X which is a linear organopolysiloxane comprising siloxyl units (I.1) to (I.3) having the formulae below:

$$Y_a Z^1_b SiO_{\frac{4-(a+b)}{2}} \quad (I.1)$$

$$Z^2_3 SiO_{\frac{1}{2}} \quad (I.2)$$

$$H_d Z^3_e SiO_{\frac{4-(d+e)}{2}} \quad (I.3)$$

and not comprising units of formula (I.4):

$$Z^2_2 SiO_{\frac{2}{2}} \quad (I.4)$$

in which:
a=1 and b=1 or 2;
d=1 and e=1 or 2;
the symbol Y represents a radical comprising a hydrocarbon-based group having from 2 to 20 carbon atoms and an epoxy function, with optionally one or more heteroatoms such as an oxygen atom, and
the symbols $Z^1$, $Z^2$ and $Z^3$, which may be identical or different, represent a monovalent hydrocarbon-based group having from 1 to 30 carbon atoms, with the following conditions:
   the additive X comprises, per molecule, at least two siloxyl units (I.1) bearing epoxyfunctional hydrocarbon-based groups, at least three siloxyl units (I.3) bearing hydrosiloxyl groups and a total number N of siloxyl units of between 7 and 30, and
the additive X has a content of siloxyl units (I.1) of greater than or equal to 200 mmol per 100 g of additive X;

2) applying on at least one face of said flexible support S the aqueous silicone emulsion E1, and 3) removing the water and carrying out the crosslinking, optionally by heating to a temperature of between 80° C. and 220° C.

2. The process according to claim 1, in which, in 1), the aqueous silicone emulsion E1 is prepared by mixing:

a first "pre-emulsion" comprising the organopolysiloxanes A and B, the emulsifying agent D, the crosslinking inhibitor F, water, optionally at least one pH-fixing agent G chosen so as to maintain the pH of the emulsion E1 between 5 and 9 and optionally at least one formulation additive H, a catalysing second "pre-emulsion" comprising the polyaddition catalyst C, the emulsifying agent D, the organopolysiloxane, water, optionally at least one pH-fixing agent G chosen so as to maintain the pH of the emulsion E1 between 5 and 9 and optionally at least one formulation additive H, and a third "pre-emulsion" comprising the additive X, the emulsifying agent D, water, optionally at least one pH-fixing agent G chosen so as to maintain the pH of the emulsion E1 between 5 and 9 and optionally at least one formulation additive H.

3. The process according to claim 1, in which the additive X has a content of siloxyl units (I.1) of greater than or equal to 200 mmol per 100 g of additive X and a content of siloxyl units (I.3) of greater than or equal to 300 mmol per 100 g of additive X.

4. The process according to claim 1, in which the additive X has a number N1 of siloxyl units (I.1) and a number N3 of siloxy units (I.3) which correspond to the following conditions:

2≤N1≤10 and

3≤N3≤20.

5. The process according to claim 1, wherein the additive X has a total number N of siloxyl units of between 7 and 25 limits included.

6. The process according to claim 1, wherein, for the siloxyl unit (I.1) of the additive X, the symbol Y is chosen from the group consisting of the groups (R-1) to (R-6) having the following formulae:

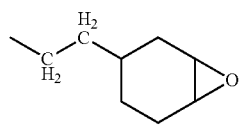 (R-1)

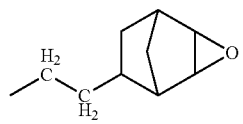 (R-2)

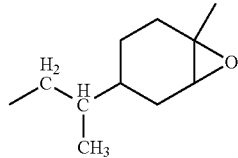 (R-3)

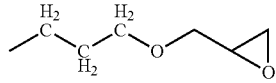 (R-4)

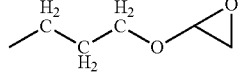 (R-5)

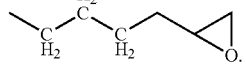 (R-6)

7. The process according to claim 1, in which the emulsion or the mixture of emulsion E1 comprises at least one organopolysiloxane A comprising:

at least two siloxyl units (I.5) having the formula below:

$$W_a Z_b SiO_{\frac{4-(a+b)}{2}} \quad (I.5)$$

in which:
a=1 or 2, b=0, 1 or 2 and a+b=1, 2 or 3;
W independently represents an alkenyl group, optionally having from 2 to 6 carbon atoms and,
Z independently represents a monovalent hydrocarbon-based group having from 1 to 30 carbon atoms and at least one siloxyl unit (I.6) having the formula:

$$Z^1_a SiO_{\frac{4-a}{2}} \quad (I.6)$$

in which:
a=0, 1, 2 or 3, and
$Z^1$ independently represents a monovalent hydrocarbon-based group having from 1 to 30 carbon atoms.

8. The according to claim 1, in which the content of additive X is between 0.1% and 10% by weight relative to the total weight of the emulsion or of the mixture of emulsion E1.

9. The process according to claim 1, in which the additive X has a dynamic viscosity at 25° C. of between 10 and 700 mPa·s.

10. The process according to claim 1, in which the emulsifying agent D is chosen from the group consisting of surfactants, protective colloids and mixtures thereof.

11. An aqueous silicone emulsion E1 which can be crosslinked into a silicone elastomer by the polyaddition reaction as described in the process according to claim 1.

* * * * *